Sept. 18, 1945. A. H. SCHUTTE 2,385,236
EMULSION DEOILING
Filed Feb. 7, 1941
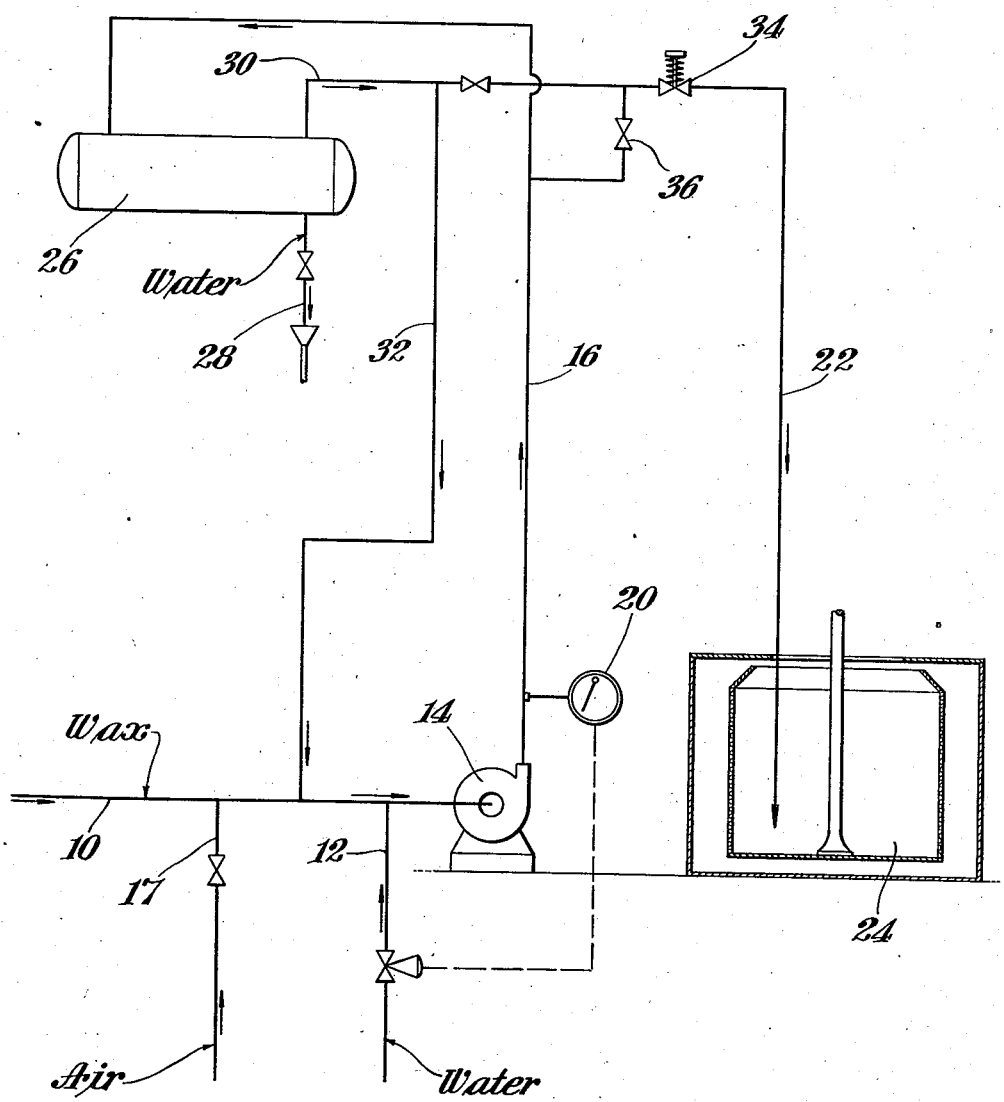
INVENTOR
August Henry Schutte
BY
ATTORNEY Patented Sept. 18, 1945

2,385,236

UNITED STATES PATENT OFFICE 2,385,236

EMULSION DEOILING

August Henry Schutte, Tuckahoe, N. Y.

Application February 7, 1941, Serial No. 377,801

2 Claims. (Cl. 196—18)

This invention relates to improvements in the preparation of emulsions and more particularly to the emulsification of a mixture of materials of different melting points so that the resulting emulsion, upon chilling, may be suitably separated by liquid-solid separating means into its respective constituents.

In my patents, No. 2,168,306, issued August 1, 1939, and No. 2,326,071, issued August 3, 1943, I have described a unique method of and apparatus for the continuous separation treatment of wax-oil mixtures. My process is particularly adaptable to the production of high melting point waxes from crude scale wax. Such process includes the emulsification of a crude scale wax or a similar wax-oil mixture in liquid condition with an immiscible, non-solvent fluid material such as water or water and air and the subsequent chilling of the emulsion so formed to solidify the desired waxes. Thereafter, such emulsion, which normally has the appearance of whipped cream, is fed to a liquid-solid separator such as a centrifugal filter. A cake, comprising the solidified waxes, is formed on the filter wall of the filter and is continuously discharged therefrom because of the resultant of the forces that are proportional to the density of the cake, which is relatively light, and of the slurry feed, which is relatively heavy. The filtrate, which comprises the water and the liquid part of the initial mixture including the oil and waxes of lower melting point, is simultaneously removed through the filter wall and is separately collected.

Such method and apparatus have had extensive practical trials, and commercial operations are now being carried out in accordance with the invention. I have now found, however, that, in case the cooling water used to effect the chilling is relatively warm, an independent control of the water used to form the emulsion is desirable so that direct contact cooling of the emulsion can be accomplished without requiring excessive size equipment.

The principal object of my present invention is to provide an improved method for adjusting the water-wax ratio in an emulsion deoiling system in order to control the temperature of the emulsion with the available cooling water regardless of its temperature and without requiring supplemental refrigeration or emulsification equipment of excessive volumetric capacity.

Another and more specific object of my invention is to provide an emulsion deoiling system in which the available cooling water is used not only to establish the desired proportion of water in the emulsion but also to reduce the temperature of the emulsion to solidify the desired amount of wax without necessitating the recycling of a large quantity of free water through the system.

Further objects and advantages of my invention will appear from the following description of a preferred form of embodiment thereof taken in connection with the attached drawing, illustrative thereof, which is a diagrammatic flow arrangement of the deoiling system.

As described in the foregoing patents, I have separated materials of predetermined melting point from a mixture thereof by initially emulsifying the mixture in liquid condition, thereafter chilling the emulsion to solidify at least the high melting point portion thereof, and then subjecting the chilled emulsion to a liquid-solid separation to separate the liquid portion from the solids.

Successful operation of this method depends upon the production of a suitable emulsion of the particular mixture being treated. In accordance with the preferred form of embodiment of my invention, I introduce a predetermined quantity of such a mixture in liquid condition through the line 10 for emulsification. In the particular embodiment of my invention described hereinafter, a waxeous mixture such as crude scale wax may be conveniently introduced in molten condition through line 10.

This wax mixture is then commingled with water introduced through a line 12 and is emulsified therewith by recirculation of the resulting mixture of wax and water through an emulsifying device 14 as more fully described hereinafter. Such water serves not only to form a component of the emulsion but also to cool the emulsion to the desired temperature and to remove the latent heat of crystallization and the work of mixing. The emulsion is discharged from emulsifying device 14 through line 16. Air under a suitable pressure is normally introduced through line 17 to aid in the formation of the emulsion.

For purposes of illustration only, the following typical conditions may be considered: the crude scale wax had a melting point of 110° F., and the water was available at 82° F.; it was necessary to cool the resulting emulsion to a temperature of 93° F. to obtain the desired wax.

Ordinarily, with a mixture of this type, I find that a recycle ratio of approximately seven to one through the emulsifying device 14 is required. With a feed of twenty gallons per minute of crude scale wax, the discharge from emulsifier 14 through the line 16 includes one hundred sixty gallons per minute of scale wax.

I find, however, that, with the melted scale wax at a temperature of 115° F. and with the water at 82° F., it is necessary to have approximately five times as much water as wax to accomplish the desired emulsification and cooling and that the flow of water through the line 12 is approximately one hundred gallons per minute. The amount of water introduced may be effectively controlled by the recording temperature controller 20. If all of this water and wax is continuously recycled through the system with a recycle ratio of seven to one, it will be apparent that the size of the emulsifying device would be extremely excessive.

The quantity of water required to produce the emulsion, however, is only approximately equal to the amount of scale wax charged to the system; thus, twenty gallons per minute of water is usually sufficient to make the desired emulsion. With a cooling requirement of one hundred gallons per minute of water, a large portion of this water is unnecessary to the emulsion, and its presence would reduce the number of passes which the wax makes through the emulsifier.

In accordance with my invention, I am able not only to obtain the necessary cooling effect with the relatively warm water but also to obtain effective results with the minimum size of equipment. More particularly, I pass the emulsion from discharge line 16 into a settling tank 26 of such size that there can be a settling of the unemulsified or free water from the emulsion and the resulting water layer can be drained off through the line 28. The final emulsion is discharged through the line 30; a portion thereof passes through line 22 containing the spring loaded valve 34 into the separator 24, and the remainder passes through the line 32 for recirculation through the emulsifying device 14. The water removed at 28 is approximately equal in this case to eighty gallons per minute; and, therefore, the emulsifier can be reduced in size since this amount of water need not be recirculated. The bypass 36 may be provided to permit withdrawal of the emulsion directly from the emulsifier.

It will, therefore, be seen that in this case the size of the emulsifier may be reduced from an apparent capacity sufficient to handle one hundred sixty gallons per minute of scale wax and eight hundred gallons per minute of water to an actual capacity of one hundred sixty gallons per minute of scale wax and only two hundred forty gallons per minute of water. The amount of water introduced at 12 is one hundred gallons per minute, of which eighty gallons per minute is discharged at 28 and twenty gallons per minute goes into the emulsion in line 22. It should be noted that the device employed to subsequently separate the solidified material from the remainder of the emulsion is also necessarily reduced in size since the quantity of material which it is required to handle is considerably less in amount because of the elimination of the unemulsified water.

It will, of course, be appreciated that, if the temperature of the water were made lower by refrigeration, it would not be necessary to use so much water to obtain the desired cooling conditions. However, the cost of the larger emulsifying device or the refrageration system is far greater than the cost of the small settling tank required in my process. Precise control can be obtained in this manner with the minimum of expense.

Although I have shown a preferred form of embodiment of my invention, I am aware that modifications may be made thereto; and I, therefore, desire a broad interpretation of my invention within the scope and spirit of the description herein and of the claims appended hereinafter.

I claim:

1. The method of producing an emulsion of a wax-oil mixture with water, which comprises adding to said mixture, in a liquid phase of the materials thereof, the water at a lower temperature than the melting point of the wax only and in materially excess quantity thereto, for chilling and solidification of the wax by water under moderately low temperature with relation to the melting point of the wax, passing said materials and the added water through an emulsifying zone for partial emulsification thereof, passing the partial emulsion so obtained to a settling zone and therein separating the partial emulsion from the excess water by settling of the latter, removing the partial emulsion from said settling zone, and recycling the so-removed partial emulsion through the emulsifying zone.

2. The continuous method of producing an aqueous emulsion of a wax-oil mixture, which comprises adding water to said mixture while in a liquid phase, the water being added at a lower temperature than the melting point of the wax only and in materially excess quantity thereto, for chilling and solidification of the wax by water under moderately low temperature with relation to the melting point of the wax, continuously passing said materials and the added water through an emulsifying zone for partial emulsification, passing the partial emulsion so obtained to a settling zone and therein separating the partial emulsion from the excess water by settling of the latter, continuously removing the partial emulsion from said settling zone, continuously recycling the so-removed partial emulsion through the emulsifying zone, and progressively removing the settled water from the settling zone.

AUGUST HENRY SCHUTTE.